May 28, 1946.　　K. J. WALKER ET AL　　2,401,124
FILLING NOZZLE VALVE
Filed Feb. 21, 1944
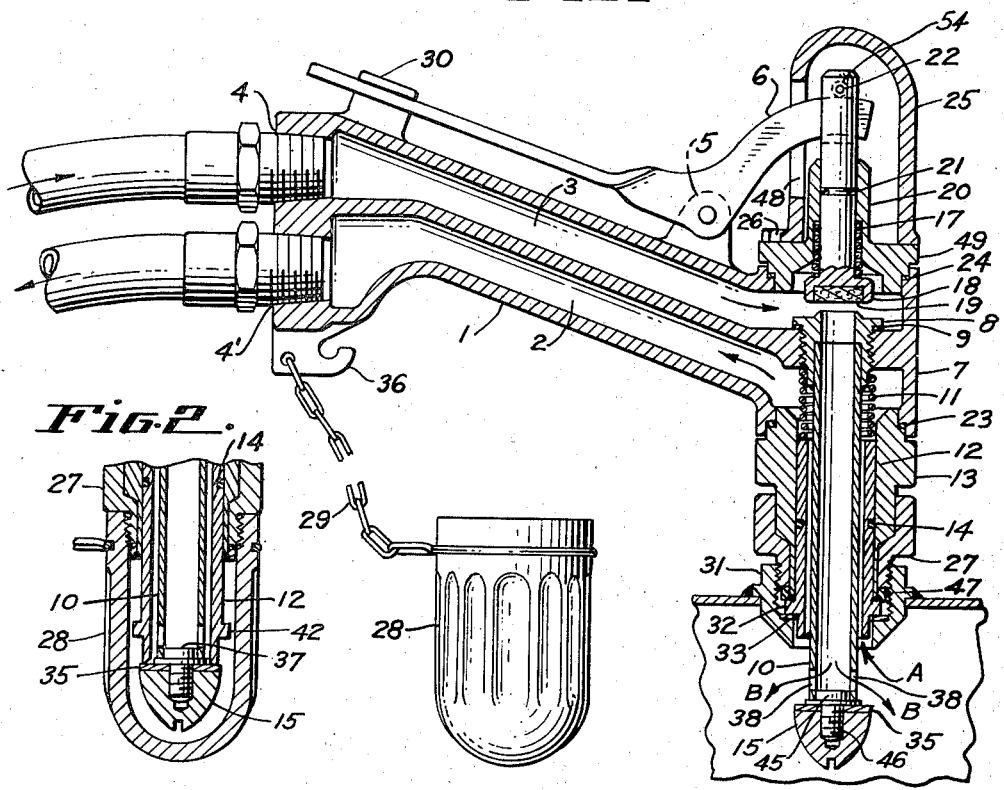
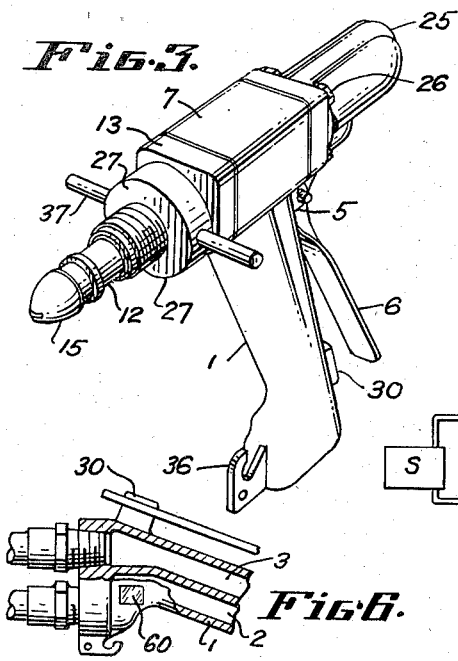
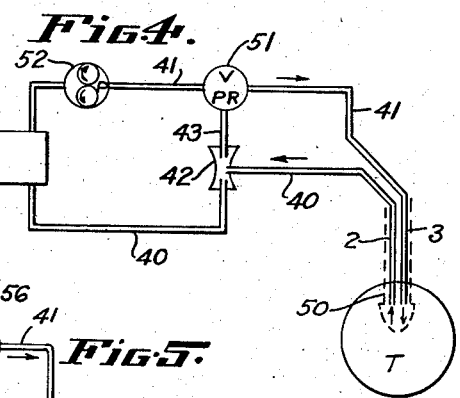
INVENTORS
KENNETH JAMES WALKER
CARSON E. HAWK
BY
Christie and Angus
ATTORNEYS Patented May 28, 1946

2,401,124

UNITED STATES PATENT OFFICE 2,401,124

FILLING NOZZLE VALVE

Kenneth James Walker, Los Angeles, and Carson E. Hawk, Glendale, Calif., assignors to Aerojet Engineering Corporation, Azusa, Calif., a corporation of Delaware Application February 21, 1944, Serial No. 523,228

9 Claims. (Cl. 226—119)

This invention relates to filling systems and has for its object to provide a nozzle valve which can be used in a closed filling system.

It is a common practice to fill tanks and receptacles through a filling conduit forming a nozzle. In many cases, especially when the tank is being filled with dangerous or corrosive fluids, damages are created from the fact that some of the fluid will spatter out through the vent or will overflow from the tank or will leak from the filling nozzle when it is removed.

According to our invention we provide a filling nozzle provided with an automatic venting device forming a closed system. By the use of this means any overflow passes back through the automatic venting device into the supply tank from which the fluid is being supplied. Features of the invention reside in the novel construction and arrangement of the nozzle, and the valve means for turning on and off the flow of fluid.

The invention will be better understood from the following detailed description and the accompanying drawing of which:

Fig. 1 is a cross sectional elevation view of the nozzle valve according to this invention, shown attached to a tank to be filled;

Fig. 2 is a cross sectional view of the delivery end of the nozzle valve shown in Fig. 1;

Fig. 3 is a perspective view of the nozzle valve shown in Fig. 1;

Fig. 4 shows diagrammatically the operation of the closed filling system embodied in the valve of Figs. 1 to 3;

Fig. 5 shows schematically the operation of another embodiment of the closed filling system; and Fig. 6 is a partial sectional view of the upper portion of the filling nozzle valve showing means whereby the return of the fluid to its source may be visualized.

Similar numerals refer to similar parts throughout the views.

The valve shown in Figs. 1 to 3 comprises a body portion 1 containing two passageways 2 and 3 leading from inlet nipples 4' and 4 respectively, through the valve. Suitable tubes are adapted to be connected to the nipples 4' and 4 from the fluid supply tank.

The valve comprises a housing portion 7 attached to member 1 into which is threaded a valve seat 8 having a centrally located hole and a flange which presses down on a gasket 9. There is welded into member 8 a cylindrical sleeve 10 into the lower end of which there is forced a plug 45 carrying an outwardly extension screw 46 to which is threaded a head 15 carrying a flat auxiliary valve disc 35. Outlet holes 38 are provided through the lower wall of sleeve 10 above the head 45.

Around the cylindrical sleeve 10 is a larger tubular sleeve 12 having a stop ring 32 near its lower end, and is under pressure of spring 11, permitting sufficient clearance for a passage A. Said sleeve 12, having an "O" ring 14, slides in the lower valve cap 13 which is screwed into housing 7 and presses against gasket 23. A ring 47 is attached to the lower end of the valve cap 13 holding ferrule 27 in a freely rotatable position. Ferrule 27 is of a tubular shape having a lower portion provided with threads running up to a shoulder which defines the upper enlarged tubular end which may be knurled or provided with removable lugs 37 for easier turning, and an opening is provided therein which permits a good fit for the lower valve cap 13.

Upper valve cap 20 is held in the upper section of the body portion 7 against a gasket 24 by bolts 26 which run through flange 49, body portion 7, and are screwed into lower valve cap 13. A piston valve 18, having an "O" ring 21 and a soft seat 19 operating in conjunction with valve seat 8 slides against the pressure of spring 17 in the upper valve cap 20. The piston of said piston valve 18 is slotted longitudinally in its upper end, permitting the shorter arm of a bellcrank 6 to operate said piston valve 18 against an inserted roller 54 secured by pin 22 which is pressed into the extreme upper portion of said piston valve.

A cover 25 is placed on top of upper valve cap flange 49 and may be secured in a suitable manner as by machine screws (not shown) running through the cover 25 and threaded into flange 49. Cover 25 is slotted at 48 permitting a clearance for the shorter arm of operating bellcrank whose fulcrum 5 is fastened into a protruding boss of body portion 7. The longer arm of the bell crank may be slid under the lever holding latch 30.

A nozzle protector cap 28 is provided and secured to the body portion 7 by means of a small chain 29 at the suspension hook 36.

To use the nozzle valve the nozzle protector cap 28 is unscrewed from the position it occupies in its unused condition on ferrule 27, shown in Fig. 2, and it may be hung from hook 36. The nozzle is inserted into a tank boss 31 and pushed in compressing spring 11 until the threads of ferrule 27 engage the threads of said tank boss 31. Ferrule 27 is screwed in, causing ring 47 to engage ring 32 of outer sleeve 12 and compressing gasket 33 which is contained in said tank boss 31. In Fig. 3 we show a perspective view of the nozzle filler valve in which ferrule 27 is provided with removable lugs 37 which help to screw the ferrule tightly into the tank cap 31. This pushes cylindrical sleeve 10 into the tank uncovering outlet holes 38 and the nozzle valve is ready for operation. By pressing down the longer arm of bellcrank 6 piston valve 18 is raised and the fluid flows through channel 3, concentric hole in valve seat 8, and through outlet holes 38 located in said lower wall of sleeve 10 above the head 45 into the tank to be filled. Any accumulated gas pressures in the tank may escape through passage A, channel 2 and out into the closed system, as is more particularly described with reference to Figs. 4 and 5.

When filling a large tank which may consume some time, the longer arm of the bellcrank 6 may be secured by slipping it under the clip 30 as illustrated. When the tank is full the fluid will not overflow but is returned through the vent system as described above, back into the source of the fluid. Upon completion of the filling, the longer arm of bellcrank 6 is released, spring 17 closes valve seat 8. The filler nozzle is removed after ferrule 27 is unscrewed from the tank boss 31 and spring 11 forces sleeve 12 down upon valve disc 35 thereby shutting off any fluid which might leak out of the two passages at A and B. This position is illustrated in Fig. 2 in which sleeve 12 is shown down on valve disc 35 which shuts off both passages as described above. Nozzle protector cap 28 is shown in place screwed up against the ferrule 27.

In Fig. 4 we show a schematic view of a closed filling system in which S is a supply tank connected by conduit 41 to pump 52, pressure relief valve 51 and the inlet channel 3 of nozzle filler valve 50 fastened into tank T which is to be filled. Conduit 43 connects the pressure relief valve 51 with ejector 42 forming thereby a by-pass line. Conduit 40 connects the supply tank S with the ejector 42 and the vent passage 2 of the nozzle filler valve 50.

At the beginning of the filling operation pump 52 is started and with the crank lever (Fig. 1) pressed down the fluid flows through conduit 41 and the inlet channel 3 of the nozzle filler into tank T. Air and fumes compressed in tank T are forced through vent channel 2, conduit 40, ejector 42 and back into source S. When tank T is full the fluid will flow in both the inlet and vent passages as indicated by the arrows. Then when the bell-crank arm 6 (Fig. 1) of the filler valve is released the inlet flow will cease and the fluid level in tank T will be above the lower extremity of boss 31 which means that the resistance to flow and the pressure head in the vent channel will compress the gas in the top of the tank S. Simultaneously, pump 52 will increase the pressure in conduit 41 operating the pressure relief valve, which shuts off the continued flow into the receptacle and opens the flow of the fluid into the by-pass conduit 43, ejector 42 and conduit 40 back into source S. This new flow will create a suction in the vent channel 2 and that part of conduit 40 between the tank T and the ejector 42 which removes the gases and fluid under pressure in the top of tank T, causing it to flow into the ejector and through conduit 40 to supply tank S. Both inlet and vent channels being closed upon the removal of the nozzle filler valve any harmful spray or leakage of dangerous fluid from said nozzle valve may be eliminated.

Referring to Figs. 5 and 6 we show a schematic view of another closed filling system in which the by-pass conduit, pressure relief valve and the ejector are eliminated. Such a system comprises a supply tank or source S being connected to the tank T which is to be filled, by a conduit 41 leading into the inlet channel 3 of filler nozzle valve 50. Vent passage 2 of filler nozzle valve is directly connected with source S by means of conduit 40.

Desiring to fill tank T with a fluid from source S pump 56 is started and the longer arm of bell-crank 6 (Fig. 1) is pressed down thereby opening valve 18 which commences the flow of fluid into the tank T. Air and fumes compressed therein are forced through vent passage 2 and conduit 40 back into the source S. When tank is full both the inlet and the vent passages are flowing fluid as indicated by the arrows 61. The return flow of the fluid may be observed through a small glass covered aperture 60 which may be provided in the side of the body portion 7 in line with the vent channel 2 as shown in Fig. 6. Shutting off the inlet flow by releasing said longer arm of bell crank 6 the ensuing pressure head in conduit 41 will restrict pump 56 and the flow of fluid in conduit 41 will stop. The compressed gases in tank T should be permitted to force the residual fluid out of the vent line 2 and conduit 40 back into source S before unscrewing ferrule 27 in preparation for removing the filler nozzle valve from the tank T. Both inlet and vent passages are closed upon the removal of said nozzle filling valve thereby averting any harmful spatter or drip of dangerous fluid from such filler valve.

It will be seen that we have provided a simple nozzle filler valve which is easily inserted into a tank to be filled and connected in such a manner as to create a closed system. Such nozzle filler valve permits filling of highly dangerous fluids without endangering the operator. When the filling device is connected to the closed system but not attached to the tank, any accidental depressing of the longer arm of the operating bell crank while the pump is still operating will not result in a flow of fluid, but instead the fluid will flow through the inlet channel as far as the auxiliary valve disc and return through the vent channel into the source.

We claim:

1. An injecting device for filling a receptacle with a fluid from a source comprising two conduits from the source to an opening in the receptacle and adapted to be fitted to the opening by a fluid-tight connection into the receptacle, a valve for opening and closing the first of the conduits a port in the lower extremity of the first conduit, a slidable sleeve around said first conduit and a fastening device in contact with said sleeve and adapted to fit the opening, the arrangement being such that upon attaching the fastening device to the opening the sleeve is retracted and said port in the first conduit is thus opened, allowing the fluid to flow into said receptacle.

2. Apparatus according to claim 1 in which there is a port in the second conduit and the retraction of the sleeve opens the port in the second conduit for flow of fluid from the receptacle to the fluid source.

3. A fluid-tight closed system for filling a receptacle with fluid, comprising a source of fluid supply, a first and a second conduit extending between the source and the receptacle, pressure means for forcing the fluid through the first conduit from the source to the receptacle, the second conduit being adapted to carry fluid from the receptacle back to the source when the receptacle overfills, a fluid by-passing device in the first conduit, a fluid ejector device in the second conduit, and a third conduit interconnecting the by-pass device and the ejector device, said ejector device receiving the fluid at high velocity from the third conduit when fluid ceases to enter the receptacle from the first conduit, thereby creating a suction in second conduit for leading said fluid away from said filled receptacle and back to said fluid source.

4. A fluid-tight closed system for filling a receptacle with fluid, comprising a source of fluid supply, a first conduit for leading the fluid from the source to the receptacle, means for forcing the fluid by pressure through the first conduit to the receptacle, a second conduit leading from within the receptacle back into the source, a device in the first conduit between the pressure means and the receptacle for shutting off the flow of fluid from first conduit to the receptacle, a third conduit extending to the second conduit from a point on the first conduit between said pressure means and the shutting off device for allowing the fluid to flow directly from the first conduit to the second conduit when the shutting off device is operated to shut off the fluid flow into the receptacle.

5. A fluid-tight closed system for filling a receptacle with fluid, comprising a source of fluid supply, a first and second conduit, a fluid by-passing device, a fluid ejecting device, pressure means for forcing said fluid from the fluid source to said receptacle, said first conduit being adapted for conducting said fluid to the pressure means and thence through said by-passing device into said receptacle, the second conduit being used to convey fluid from the receptacle back to the fluid source, a third conduit conducting said fluid from the by-passing device, through the fluid ejecting device into the second conduit and then back to fluid source, the by-passing device becoming effective for directing fluid through the third conduit into the ejecting device when the back pressure from said filled receptacle closes the passage from the first conduit to said pressure means and opens the passage from first conduit to third conduit.

6. A fluid nozzle adapted to be fitted to an opening in a receptacle to be filled, comprising a central conduit having an exit port adapted to carry the fluid into the receptacle, a retractable sleeve around the conduit and spaced therefrom to provide an annular passage between the conduit and the sleeve, a vent in communication with said passage, a second sleeve closely and slidably fitted around the first-mentioned sleeve, a fastening device in cooperating relation with the second sleeve and adapted to be fastened to the opening in the receptacle, such that when the fastening means is so fastened the first-mentioned sleeve is slidably retracted relative to the conduit and the second sleeve, thereby uncovering the port and uncovering the entrance from the receptacle into the annular passage.

7. Apparatus according to claim 6 in which a closable valve is positioned at the conduit.

8. A fluid nozzle adapted to be fitted to an opening in a receptacle to be filled, comprising a central conduit having a fluid exit port, a retractable sleeve around the conduit and spaced therefrom to provide an annular passage between the conduit and the sleeve, spring means for urging the retractable sleeve toward its unretracted position, a vent in communication with the passage, and an exit leading from the passage to the receptacle when the nozzle is fitted to the receptacle, means for covering the exit port and the exit when the retractable sleeve is in its unretracted position, a second sleeve slidably fitted about the first sleeve, and means attached to the second sleeve for retracting the retractable sleeve when the nozzle is fitted to the receptacle opening, so as to uncover the exit port and the exit.

9. A fluid nozzle adapted to be fitted to an opening in a receptacle to be filled, comprising a central conduit having a fluid exit port, a retractable sleeve around the conduit and spaced therefrom to provide an annular passage between the conduit and the sleeve having an exit into the receptacle when the nozzle is fitted to the receptacle opening, a vent in communication with the passage, a closure member fastened to the lower portion of the conduit, a second sleeve closely and slidably fitted about the first sleeve, a fastening device in cooperating relation with the second sleeve and adapted to be fastened to the opening in the receptacle such that when said fastening device is removed from said receptacle opening, the conduit is retracted into the first sleeve so that said closure member closes the exit port and the vent.

KENNETH JAMES WALKER.
CARSON E. HAWK.